UNITED STATES PATENT OFFICE.

WALTER D. FIELD, OF MILLBURN, NEW JERSEY.

COMPOUND OF SULPHURETED OILS.

SPECIFICATION forming part of Letters Patent No. 478,955, dated July 12, 1892.

Application filed December 16, 1891. Serial No. 415,290. (No specimens.)

*To all whom it may concern:*

Be it known that I, WALTER D. FIELD, a citizen of the United States, residing at Millburn township, in the county of Essex and State of New Jersey, have invented certain new and useful Improvements in Compounds of Sulphureted Oils; and I do hereby declare the following to be a full, clear, and exact description of the invention, such as will enable others skilled in the art to which it appertains to make and use the same.

My invention relates to that class of compounds described and claimed in my application, Serial No. 383,987, filed March 6, 1891, wherein I broadly claim the combination of the sulphur derivatives or compounds of the glycyl or glyceryl ethers of the unsaturated fatty acids and soluble in benzine and pyroxyline or nitro-cellulose, and also specifically claim the combination of the glycyl or glyceryl ethers of the unsaturated fatty acids combined with sulphur to form sulphur-balsam and pyroxyline or nitro-cellulose.

In this specification I describe and claim a modification of the compound therein set forth wherein sulphur introduced indirectly by the use of sulphuric acid is substituted for the sulphur introduced directly, as set forth in the specific claim of said application Serial No. 383,987.

The oils used are those known as the "glycyl" or "glyceryl" ethers of the unsaturated fatty acids. In practice I have most frequently used those glycyl or glyceryl ethers of the unsaturated fatty acids known as "cotton-seed oil" and "olive-oil," and have found them best adapted for my purpose; but rape, castor, sesame, palm, cod-liver, and the other oils, both animal and vegetable, belonging to the class of glycyl or glyceryl ethers of the unsaturated fatty acids may be used. They are combined with sulphur introduced by the use of sulphuric acid in the following manner: I add slowly to the glycyl or glyceryl ether of the unsaturated fatty acids about one-fourth its weight of sulphuric acid of 66° Baumé strength, taking care that the temperature does not rise above 40° centigrade. The mixture is then allowed to stand from twelve to eighteen hours. It is then thrown gradually into a vessel containing three times its weight of well-cooled water, which is constantly stirred until the compound rises to the surface of the water. The water is then separated from the compound, which is thoroughly washed and neutralized with caustic soda. The compound is then treated with benzine to dissolve out the sulphur derivatives or compounds of the glycyl or glyceryl ethers of the unsaturated fatty acids, which are then recovered by evaporating the benzine, leaving a compound that is substantially similar for my purposes to the sulphur derivatives or compounds formed of glycyl or glyceryl ethers of the unsaturated fatty acids and pure sulphur, but having some other elements present as impurities and forming, when combined with pyroxyline, in a degree a softer and less stable compound, having qualities, however, that will be useful where hardness and stability are not essential and where the material is not to be subjected to the elements. They are, like the compounds in which pure sulphur is used, also of a neutral character, insoluble in ethyl, methyl, or amyl alcohol and soluble in chloroform, ether, benzole, benzine, amyl acetate, propyl acetate, and some other solvents, and are of a sirupy consistency when cold and fluid when hot. With any of these sulphur derivatives or compounds when cold I mix pyroxyline or nitro-cellulose, preferably first dissolved in some solvent which is also a solvent of the sulphur derivatives or compounds and which will act harmoniously when introduced into the compound. The best method is to add the sulphur derivative to the dissolved pyroxyline in small quantities at a time and with constant stirring, and I regulate the amount of pyroxyline to be used by the degree of flexibility desired in the resulting compound, it being true, so far as I have observed, that the lesser amount of pyroxyline gives the greater flexibility to the compound and the greater amount of pyroxyline the less flexibility, and herein lies one of the most useful features of my invention, as the pyroxyline and sulphur derivatives and compounds are harmonious when united in almost any proportions, thus enabling me to get great body in my compounds by the use of the sulphur derivatives or compound and still retain the useful qualities of the pyroxyline.

The solvent used should be of medium volatility, practically anhydrous and non-hygroscopic, and one which is not only a solvent of the pyroxyline and sulphur derivative separately, but will hold both in solution when mixed. I have used with favorable results and recommend the use of amyl acetate, propyl acetate, butyl acetate, and valerinate of amyl, in some cases mixing with them some harmonious non-solvent of pyroxyline or nitro-cellulose—such as benzine—for the purpose of cheapening the compound.

What I claim as new is—

A composition of matter consisting of glycyl or glyceryl ethers, combined with sulphuric acid to form sulpho fatty acid compounds and pyroxyline or nitro-cellulose, substantially as described.

In testimony whereof I affix my signature in presence of two witnesses.

WALTER D. FIELD.

Witnesses:
JOSEPH D. GALLAGHER,
A. E. BENNETT.